INVENTOR.
ALLEN J. TROST
BY Thomas E. Schatzel
ATTORNEY

INVENTOR.
ALLEN J. TROST
BY Thomas E. Schatzel
ATTORNEY 3,519,761

RECORD EXCITATION OPTIMIZATION METHOD AND APPARATUS FOR ROTARY HEAD MAGNETIC TAPE RECORDERS

Allen J. Trost, Santa Clara, Calif., assignor to Ampex Corporation, Redwood City, Calif., a corporation of California Filed Mar. 7, 1968, Ser. No. 711,365
Int. Cl. G11b 5/46, 27/36
U.S. Cl. 179—100.2 8 Claims

ABSTRACT OF THE DISCLOSURE

A method and apparatus for optimizing the record excitation levels of the transducers of rotary head recorders. The longitudinal speed of the tape is substantially reduced. The head to be optimized is placed in the record mode and other heads in the playback mode. The longitudinal speed of the tape is selected such that a head in a playback mode and following the record mode head overlaps at least a part of the record track for immediate playback of the recorded signals. The record excitation is adjusted until the optimized condition is indicated by the playback signal.

BACKGROUND OF THE INVENTION

This invention relates in general to rotary head magnetic tape recorders and, more particularly, to a method and apparatus for optimizing the record excitation levels of the individual transducers mounted on the rotary head drum of the recorder.

In the recording and reproducing of signals on rotary head magnetic tape recorders individual channels are transversely recorded in parallel across the tape medium. These channels are subsequently reproduced in sequence. The record drive excitation (voltage or current) to each transducer is selected to an optimum value producing the largest RF output and minimum background noise in playback. Periodically, due to head wear, type of tape, and various other factors resulting from use of the transport, the optimized values change and it is necessary to make adjustments. Known prior methods for setting the optimized record excitation are time consuming and tedious. The most widely used method includes the step of loading a blank tape and noting the tape timer setting. The system is switched into the record mode. The excitation to a transducer is varied in distinct increments from a minimum to a maximum and similar decrements back to a minimum. Each increment and decrement is monitored by recording on an audio track, e.g. cue track, the head and excitation at each setting. The above procedure is repeated for each transducer. Next, the tape is rewound to the original timer setting and the individual heads switched into the playback mode. The reproduced signal of each transducer at each increment and decrement of the record level is monitored on a display scope or meter. The optimum record excitation level is noted. After playback of each transducer, the individual transducer drive amplifiers are individually set such that the excitation to the associated transducer coincides with the optimum noted value.

Two distinct disadvantages with this process are time consumption and inaccuracy. Selection of the optimum value depends upon the number of individual increments and decrements utilized. If the most optimum condition falls between selected increments, when the record level is set to one of the selected incremental values the most optimum condition is not realized.

SUMMARY OF THE INVENTION

The present invention provides a method and apparatus for immediate playback, monitoring and adjustment of the record excitation level of each individual transducer mounted on a rotary head drum. First, the longitudinal tape speed is reduced to a fraction of the normal speed. The mode of the individual transducers are selected so that one is in the record mode and the others in playback. The record excitation is gated on while the selected record transducer is in position to record on the tape. The drum is rotated at its normal speed. Due to the reduced tape speed the tape is moved only a fraction of the track width recorded by the record transducer when the following playback mode transducer engages the tape surface. Thus, the following playback transducer overlaps at least a part of the recorded track and immediately plays back the recorded signal. The reproduced signal of the playback mode transducer may be monitored by a scope or meter and the driving excitation on the record mode transducer adjusted until the monitor indicates the optimum condition.

Thus, by the present method the playback of the recorded signal is delayed only a matter of milliseconds and the monitor is continuous over all values. Once one transducer is adjusted, that transducer is switched to the playback mode and another transducer to the record mode. The procedure is then repeated.

DESCRIPTION OF THE PREFERRED EMBODIMENT

Figure 1:
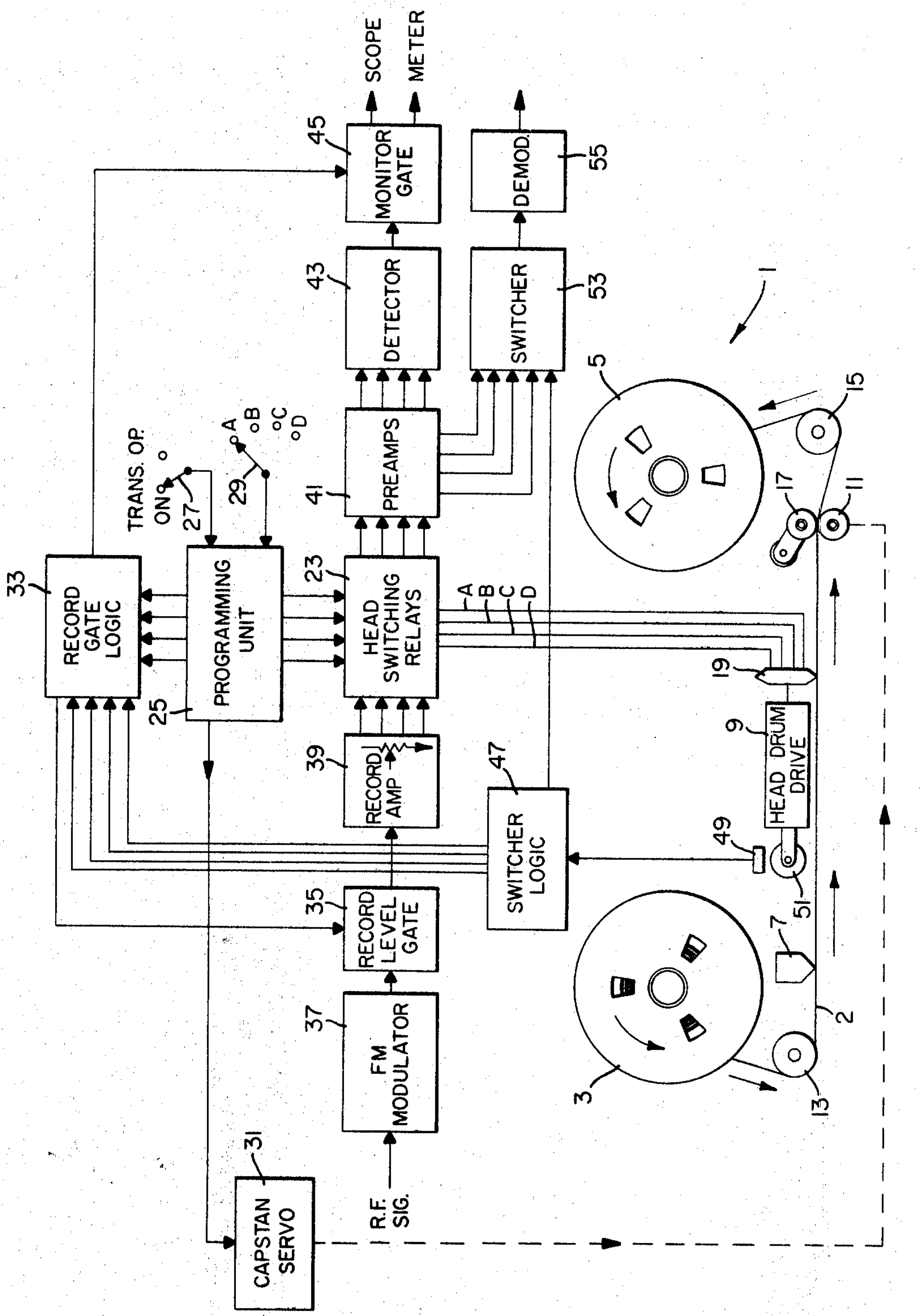
FIG. 1 is a diagrammatic illustration of the tape path, associated components and circuitry adapted for incorporating the teachings of the present invention.
Figure 2:
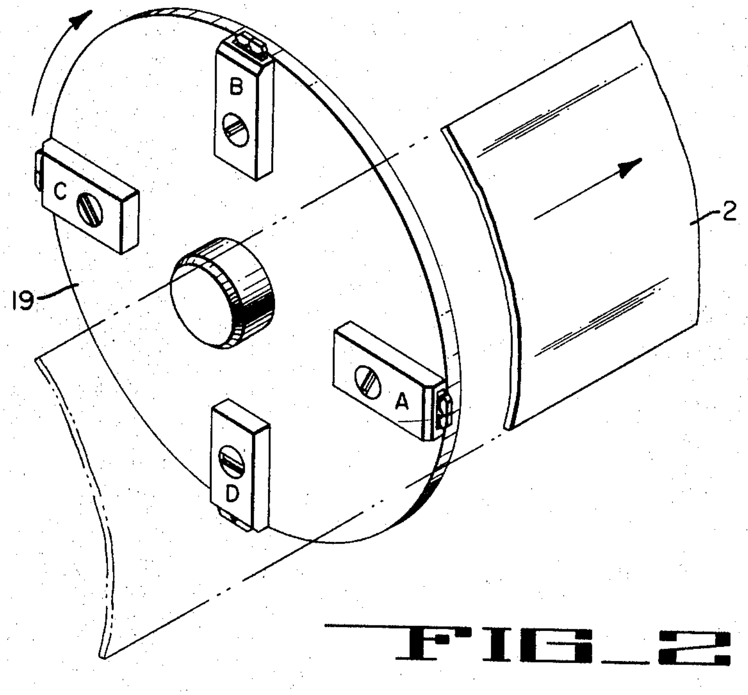
FIG. 2 is a perspective illustration of the relationship of the tape and drum of a conventional rotary head videotape recorder system.

The present invention has proven to be highly satisfactory for optimizing the record level RF voltage of individual transducers of rotary head videotape recorder systems. In FIG. 1 pertinent sections of such a system are diagrammatically illustrated. The recorder, referred to by the general reference character 1, is illustrated as including a magnetic tape 2 passing between a supply reel 3 and a take-up reel 5. The tape is pulled from the supply reel 3, across an erase head 7, across a rotary video head assembly 9, by a rotating driving capstan 11 and then rewound by the motor driven take-up reel 5. The tape path further includes a tape guide 13 and a tape timer 15. Adjacent the driving capstan 11, is a capstan pressure idler 17 for maintaining tape-to-capstan contact. The capstan 11 is servo controlled so as to maintain the longitudinal speed and position at a desired value. The rotary head assembly 9 may be of the conventional four-transducer type with the tape cupped about the outer periphery of a rotary drum 19 carrying four individual transducers spaced about the circumference and designated A, B, C and D (see FIG. 2). The drum 19 rotates about an axis extending parallel to the path of movement of the tape 2. The individual transducers A, B, C and D trace transverse tracks successively along the tape. The width of each track coincides with the width of the transducers at their respective non-magnetic gaps.

In normal present day accepted standards for the operation of transverse rotary head, video recording the tape 2 is moved longitudinally at seven and one-half or fifteen inches per second (i.p.s.), the magnetic tape is two inches wide, the rotational head drum velocity in the order of 240 revolutions per second (r.p.s.) and the track width in the order of five or ten mils. Obviously, the stated standards are included for illustrative purposes and facilitating in the description.

To realize optimum recording and reproducing the video record levels of each transducer should be at the optimum value. Such is desirable in order to realize the desired signal-to-noise ratio and phase relationships. Thus, the driving current must be checked frequently and adjusted due to changed operating condition. In FIG. 1, circuitry is shown for rapid and accurate checking and adjusting of the video record levels of the individual transducers in accordance with the method of the present invention.

The method of the present invention teaches that when it is desirable to check and adjust for transducer optimization that the longitudinal speed of the tape be reduced, e.g. one-fourth of normal value. Thus, the speed of the driving capstan 11 may be reduced such that the tape speed is reduced to the order of 3¾ or 1⅞ inches per second depending on the standard employed. The head drum is driven at the normal rate. One of the transducers, A, B, C or D, is selected and placed in the record mode. The unselected transducers are placed in the playback mode. The RF voltage level to the selected transducer is adjusted and applied to the selected transducer during the time it is in position to record on the tape. Assuming the non-gap of the selected transducer in ten mils wide, a track of ten mils is transversely recorded. Further assuming the transducers are spaced ninety degrees apart on the drum 19, the drum velocity at 240 revolutions per second, and the tape speed at 3¾ inches per second, the longitudinal travel of the tape is less than a track width before the following playback mode transducer contacts the tape. Thus, when the following playback transducer engages the tape 2, it overlaps a portion of the previously recorded track. The playback mode transducers are joined in a playback display, e.g. scope or/and meter. The driving current to the record mode transducer is adjusted until the optimum playback is indicated on the display. Then another transducer is switched to the record mode, the previous optimized transducer switched to the playback mode and the process repeated.

Figure 3:
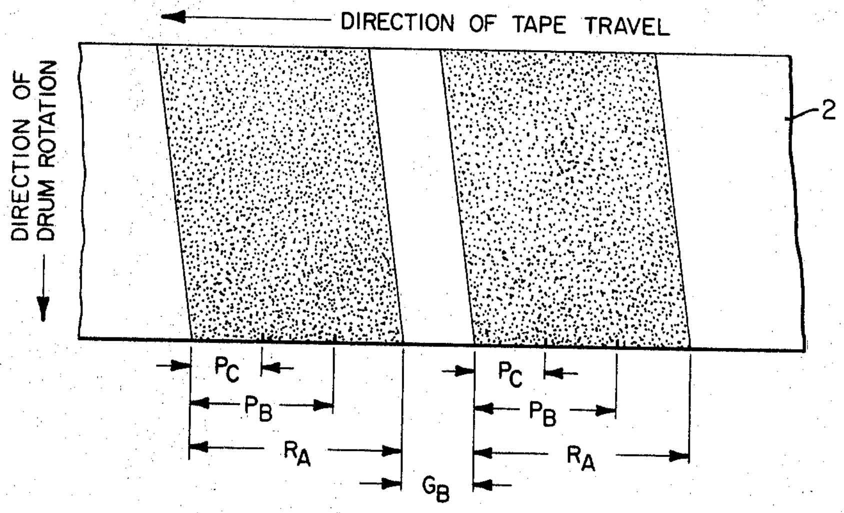
FIG. 3 is a diagrammatic illustration of a magnetic tape segment illustrating the relationships of the recorded tracks and tape travel during the optimization procedures according to the teachings of the present invention.

Viewing FIG. 3, a segment of the tape medium 2 is illustrated. Assuming the transducer A is in the selected record mode, a record track $R_A$ is recorded. With a ten mil track and 3¾ i.p.s. longitudinal speed, or a five mil track and 1⅞ i.p.s. longitudinal speed, the tape 2 is advanced approximately one-third of the width of the track $R_A$ when the playback transducer B engages the tape 2. Thus, transducer B plays back a segment $P_B$ of the recorded track. Also, the playback transducer C engages the tape overlapping approximately one-third of the recorded track as designated by the dimension $P_C$. In the illustrated embodiment, the playback transducer D does not overlap any portion of the recorded track $R_A$ but engages the tape at the guardband $G_B$. The signals from the playback transducers B and C may then be processed and displayed. It may be noted that a reduction of the longitudinal speed to one-sixth the standard, that the transducer D would also overlap. The transducer A would then record its second track immediately adjacent to the first without a guardband.

FIG. 1 illustrates circuitry designed for practicing the desecribed transducer optimization method. The individual transducers A, B, C and D on the drum 19 are common to a conventional head switching relay network 23. The network 23 responds to mode program signals and provides means for switching the individual transducers into the selected record or playback mode of operation. The network 23 receives input commands from a programming unit 25 which receives commands from a two-position head optimization switch 27 and a channel selector switch 29. When head optimization is desired, the switch 27 is switched to the "ON" position and the program unit 25 sends out a signal to a capstan servo network 31 which commands that the capstan and the longitudinal tape speed be reduced, e.g. one-fourth the normal value. The position of the switch 29 indicates the selected transducer and the programming unit 25 sends out signals to the head switching relays as to which of the four heads is selected for the record mode. The program unit 25 also provides a command signal to a record gate logic network 33. The network 33 provides a command signal to a record level gating network 35 which receives a modulated signal from an FM modulator 37, in turn receiving an RF signal. The gating network 35 controls the providing of an RF modulated signal to a record amplifier network 39 which may internally include a variable means for adjusting the magnitude of the RF volts applied to the selected transducer. The network 39 may include separate driving amplifiers for each transducer A, B, C and D with the amplifier to the selected transducer being adjusted for optimum response.

The head switching relay network 23 further controls receipt by a preamplifier network 41 of the playback signals from the three heads in the playback mode. Depending upon which transducer is to be optimized, the command signal from the unit 25, the relay network 23 ties in the three playback mode transducers with respective preamps in the network 41. The output of the preamp 41 is received by a detecting network 43 and fed through a monitor gate 45 to a scope display unit and meter display unit. The gate 45 receives a command signal from the record gate logic network 33 and is designed such that during the record mode the display unit tied on to the gate 45 does not receive any signals. The network 33 receives command signals from a conventional switcher logic network 47 in turn tied to a tachometer pickup 49 of a once-around tachometer 51 coupled to the head drum drive 9. The network 47 is conventional with numerous presently available videotape recorders and provides signals indicative of the position of each transducer on the head drum 19. The network 47 also serves herein as a means for providing signals to the record gate logic network 33 indicative of the position of each transducer A, B, C and D. The network 33 in turn provides first signals to the record level gate 35 to interrupt the RF voltage to the amplifier 39 when the select transducer is not in position to record on the tape. The network 33 further provides signals to the monitor gate 45 such that the display units are connected to the detector 43 only when the selected head is off the tape 2. The output of the preamp is also received by a conventional switcher 53 responsive to the logic network 47 and then by a demodulating network 55 as is conventional in the reproduce circuitry of rotary head, videotape recorders. The output of the network 47 to the switcher 53 is shown as a single lead but in actuality carries signals indicative of the actual position of each of the four transducers.

Accordingly, when it is desired to optimize the video record level of the transducers, the switch 27 is switched to the "ON" position and the switch 29 to the desired individual transducer A, B, C or D. The capstan servo 31 then slows the speed of the capstan 11. The record amplifier network 39 switches in the amplifier of the selected transducer and the other three are tied into their respective preamplifiers of the network 41. The modulated record RF volts to the select transducer is applied when the transducer engages the tape and the display units are disconnected. When the record excitation is off, the display units are connected to receive the playback signals. The vernier adjustments in the record amplifier network 39 are adjusted until an optimum value is indicated by the display units.

The present method allows for the incorporation of many standard components of a recorder. For example, the feedback signals from the switcher logic network are commonly available and utilized for controlling the playback switcher 53. Likewise, the signals to the detector 43 are commonly available. Thus, the present method and apparatus allow for utilization of standard readily available networks without necessitating incorporation of detailed additional circuitry.

I claim:

1. A method for optimizing the record excitation level of individual transducers of rotary head magnetic tape recorders wherein the tape is driven longitudinally and the recorded tracks of the transducers are transverse across the tape, comprising the steps of:

reducing the normal longitudinal tape speed, the reduced speed allowing for the paths of successive transducers across the tape to at least partially overlap;

placing the mode of operation of a first transducer to be optimized in the record mode;

placing the mode of operation of successive transducers overlapping the path of the first transducer in the playback mode;

monitoring the playback signal of the transducers in the playback mode; and adjusting the drive excitation of the first transducer in accordance with the monitored playback signal.

2. The method of claim 1 in which the record excitation is applied only during the time the first transducer is in position to record on the tape.

3. The method of claim 1 in which the reduced longitudinal tape speed is of an order allowing for the paths of more than two successive transducers across the tape to at least partially overlap each other.

4. The method of claim 1 in which the reduced longitudinal tape speed is selected to allow for the paths of successive transducers across the tape to at least partially overlap and to provide a guardband between successive tracks recorded by the first transducer.

5. The method of claim 4 in which the record current is applied only during the time the first transducer is in position to record on the tape.

6. In a rotary head magnetic tape recorder having a plurality of individual transducers mounted on a rotary drum transversely scanning a longitudinal moving tape, driving means for transporting the tape longitudinally past the rotary drum, first means for adjusting the record excitation level to individual transducers, second means for placing the transducers individually in the playback or record mode of operation, third means for providing indications of the position of each transducer, and playback means for generating signals indicative of the reproduce signals of the transducers in the playback modes, in combination with: a programming unit responsive to a signal that the record level of a selected transducer is to be adjusted; the unit providing a command signal to the driving means to reduce the longitudinal speed of the tape and to the second means to place the selected transducer in the record mode; record gate means responsive to the command of the programming unit and responsive to the indications of the third means, the record gate means providing a position signal when the selected transducer is in position to record on the tape; monitoring means responsive to the position signal to receive the reproduced signals of the playback means.

7. The rotary head magnetic tape recorder of claim 6 further including record level gating means responsive to the record gate means, the record level gating means interrupting record excitation when the selected transducer is not in position to record on the tape.

8. The rotary head magnetic tape recorder of claim 7 wherein said monitoring means includes a monitor gating means responsive to the record gate means for disconnecting the monitoring means when the selected transducer is not in position to record on the tape.

References Cited

UNITED STATES PATENTS

| | | | |
|---|---|---|---|
| 2,791,640 | 5/1957 | Wolfe | 179—100.2 |
| 3,225,135 | 12/1965 | Osawa et al. | 179—100.2 |
| 3,375,331 | 3/1968 | Okazaki et al. | 179—100.2 |

TERRELL W. FEARS, Primary Examiner

R. S. TUPPER, Assistant Examiner

U.S. Cl. X.R.

178—6.6